United States Patent [19]

Fling et al.

[11] 4,147,060
[45] Apr. 3, 1979

[54] ADJUSTABLE FRAME LIQUID LEVEL MEASURING DEVICE

[76] Inventors: William F. Fling, 351 S. Fuller Ave. Apt. 35, Los Angeles, Calif. 90036; Paul A. Stolzke, P.O. Box 878, Lawndale, Calif. 90260

[21] Appl. No.: 875,541

[22] Filed: Feb. 6, 1978

[51] Int. Cl.² .............................................. G01F 23/08
[52] U.S. Cl. .......................................... 73/321; 73/318
[58] Field of Search ................. 73/305, 317, 318, 319, 73/321

[56] References Cited

U.S. PATENT DOCUMENTS

| Re. 27,767 | 10/1973 | Schoepflin | 73/318 |
|---|---|---|---|
| 1,141,500 | 6/1915 | Stahle | 73/317 |
| 1,286,953 | 12/1918 | Decker | 73/317 |
| 1,448,842 | 3/1923 | Gregory | 73/317 |
| 1,512,752 | 10/1924 | Fisk | 73/321 |
| 1,585,382 | 5/1926 | Haigh et al. | 73/321 |
| 2,237,462 | 4/1941 | Tokheim | 73/321 |
| 2,995,824 | 8/1961 | Wells | 73/321 X |
| 3,359,799 | 12/1967 | Lubin | 73/308 |
| 4,078,430 | 3/1978 | Pemberton et al. | 73/321 X |

Primary Examiner—Charles Gorenstein
Attorney, Agent, or Firm—William E. Jackson

[57] ABSTRACT

An adjustable liquid level measuring device for measuring the level of a liquid in a variety of container configurations. The device has an indicator means for mounting on a container for providing a visual reading related to the level of the liquid in the container. The device has a frame connected to the indicator means and a buoyant float adapted for floating on the surface of the liquid in the container. The device has an endless flexible chain with a first loop adjacent to the indicator means and another portion connected to the buoyant float. The chain also has a loop movably mounted on the frame so that movement of the float moves the first loop relative to the indicator means. The indicator means is connected to have an indicator dial pointer moved by the movement of the first loop. The frame has first and second elongated frame sections with the first frame section being adapted for mounting on the wall of a container and the second frame section being adapted to extend toward a position adjacent the lowest point of the interior of the liquid container. A pivotal connection between the first and second frame sections provides for 90° angular displacement of the frame sections so that the device can be in an end and top reading mode on a container.

10 Claims, 13 Drawing Figures

ADJUSTABLE FRAME LIQUID LEVEL MEASURING DEVICE

BACKGROUND OF THE INVENTION

1. Field of the Invention

The present invention relates to liquid level measuring devices, and more particularly to such devices which are constructed so that they can be adjusted for the different conditions met when installing the devices in differently constructed tanks and other liquid containers.

2. Description of the Prior Art

The prior art related to liquid level measuring devices discloses such devices which are capable of adjustment in their configurations for use in tanks and other containers having various wall orientations, volumes, sizes and shapes. For example, U.S. Pat. No. 1,141,500 discloses a liquid level measuring device mountable within a container in two different modes. The first mode, which we will refer to as a "top reading" mode, involves the mounting of an indicator in the top wall of a liquid container with the remainder of the device extending downwardly toward the liquid in the bottom of the container. In another mode, which we will call the "end reading" mode, the indicator is mounted in a side wall of a liquid container and the remainder of the device extends inwardly and downwardly into the liquid in the container. Other forms of top and end reading liquid measuring devices are disclosed in U.S. Pat. Nos. 1,286,953 and 1,448,842. The prior art, exemplified by the cited U.S. patents, has recognized the practical and economic advantages of providing liquid level measuring devices which can be adjusted for use in tanks or containers having various sizes and orientations. One such advantage is that the user has a multipurpose device for use in a variety of situations rather than having an individual measuring device for each tank size and orientation.

In recent years, various governmental and private organizations have developed uniform specifications for liquid shipping and storage drums. For example, there are specific standards for the so-called 30 and 55-gal. "Tight-Head Universal Drums". One such specification is D.O.T. Specification 17E, published in the Code of Federal Regulations Title 49, Part 178. Thus, the containers frequently found in industrial use will conform to one or more uniform specifications. It should be apparent, for example, that an industrial user may have numerous 55-gal drums on hand holding an inventory of liquids. Moreover, a user may have a number of 30-gal. drums on hand to hold an inventory of liquids. As to each of these types of containers, it may be that the user will store them in one of two types of orientations. First, one type of orientation is to lay the drums on their sides and to stack drums on top of each other with all of the axes of the drums running in one direction and the openings in the drum heads all facing the same direction. Another type of storage orientation is to have all of the drums together in a vertical orientation with the openings in the drum heads being at the top. In order to measure the liquid level in any drum, the user would need a top reading liquid level measuring device when the drums are vertically oriented and an end reading liquid level measuring device when the drums are in a horizontal storage configuration.

Certain disadvantages may be encountered when the prior art liquid level measuring devices are used in connection with the 30, 40, 55, etc. gallon drums now in widespread use. For example, standard 30 and 55-gal. drums have diametrically opposed openings in the drum head, one opening being a ¾" fitting and the other opening being a 2" fitting. Thus, when a drum is used in a vertical orientation, one opening is utilized for the insertion of a means to withdraw the liquid from the drum and the other opening is available for the insertion of a liquid level measuring device. Thus, the liquid removal device and liquid level measuring device utilized in this situation must be compatible from the standpoint of the interior space utilization of the drum. Moreover, the size of the liquid level measuring device must conform to one of the standard openings. Thus, one dimension of the liquid level measuring device cannot exceed 2" in diameter thereby requiring a compact design.

SUMMARY OF THE INVENTION

An object of our invention is to provide an improved liquid level measuring device for use in the side and end reading modes.

Another object of the present invention is to provide an adjustable frame liquid level measuring device which is relatively inexpensive to manufacture and use in that the device comprises standardized elements and parts which leads to manufacturing economies as well as the interchangeability of parts by the user.

A further object of the present invention is to provide an adjustable frame liquid level measuring device which is usable with a standard 30, 40, 50, etc. gallon drum whether it is oriented on its end or on its side.

Other objects will become apparent to those skilled in the art by a reading of the description of the preferred embodiments which follows.

In accordance with the present invention we provide a liquid level measuring device for measuring the level of a liquid in a container. Our device comprises indicator means adapted for mounting on the container for providing a visual reading related to the level of the liquid in the container. The device has a frame connected to the indicator means and a buoyant float adapted for floating on the surface of the liquid in the container. In addition, our device has an endless flexible transmission means having a first portion adjacent to the indicator means and another portion connected to the buoyant float. We also provide means for movably mounting the endless flexible transmission means on the frame so that movement of the float moves the first portion of the transmission means relative to the indicator means. The frame comprises first and second elongated frame sections with the first frame section being adapted for mounting on the wall of the container and the second frame section being adapted to extend toward a position adjacent the lowest point of the interior of the liquid container. Connector means is provided for connecting the second frame section with the first frame section for angular displacement relative to the first frame section. We provide means for mounting the flexible transmission means whereby the first portion of the flexible transmission means is mounted on the first elongated frame section and another portion of the flexible transmission means is mounted on the second elongated frame section. We also provide means adjacent to the connector means for guiding the flexible transmission means when the second frame section is in an angularly displaced position relative to the first frame section. According to another aspect of our invention, the second frame section is provided with mounting means for the flexible transmission means which mounting means extends or contracts relative to said second frame section to dispose the lower portion of the transmission mounting means adjacent to the lowermost portion of the liquid container. According to another aspect of our invention we provide an alternate length mounting means and an alternate indicator means drive means for connecting the flexible transmission means to the indicator means. Still another aspect of the present invention is to provide means to mount the liquid level measuring device securely in the end reading position on a drum head without interferring with the desired orientation of the first and second frame sections.

DESCRIPTION OF THE PREFERRED EMBODIMENTS

Figure 1:
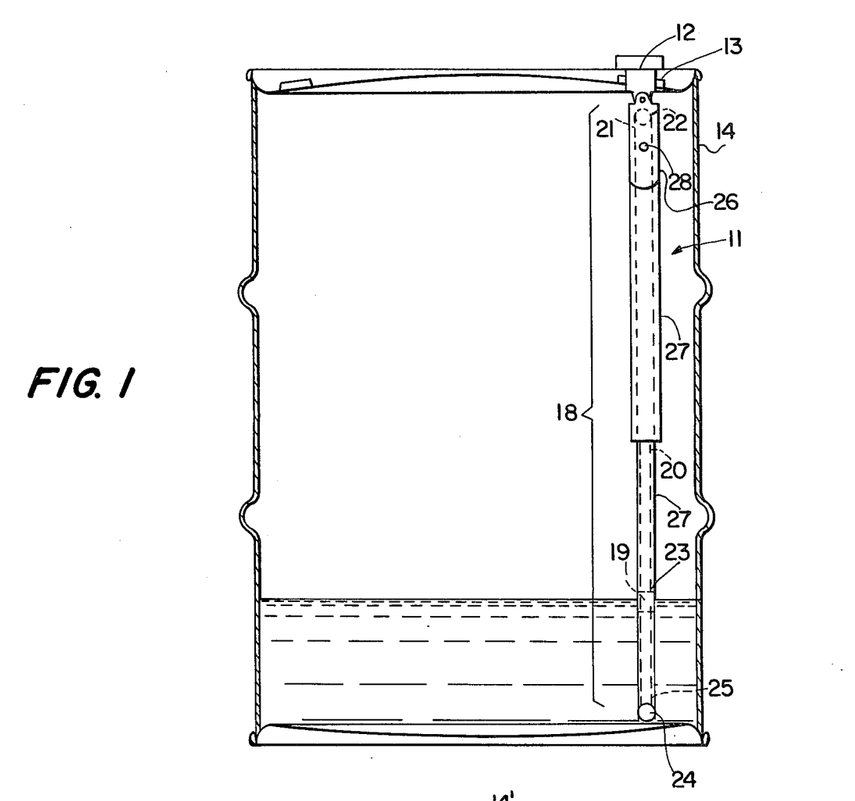
FIG. 1 is a view of one embodiment of the present invention as mounted for use in the top reading mode on a vertically oriented liquid container.

Referring to FIG. 1 of the drawing, we show a generalized view of a liquid level measuring device 11 of the present invention mounted for use in a drum configured according to governmental specification, e.g., 55-gallon.

The generalized device 11 includes indicator means 12 adapted for mounting in the 2" opening 13 in the drum head of the drum 14. This indicator means 12 has a pointer 15 movable over a scale 16 and the position of the pointer is related to the liquid level 17 in the drum at any particular point of time. Attached below the indicator means 12 is a frame 18 which extends downwardly to a point adjacent to the bottom drum head of the drum. As shown in dotted lines in FIG. 1, a buoyant float 19 is provided inside of the frame 18. For purposes of illustration, the float 19 is shown floating on the surface of the liquid shown in the drum. Also inside of the elongated frame 18 is an endless flexible transmission means 20 shown in dotted lines in FIG. 1. The endless flexible transmission means 20 has an upper portion 21 looped over an idler pulley 22 adjacent to the indicator means 12 and another intermediate portion 23 connected to the float 19. Further, the device shown in FIG. 1 has a pulley 24 mounted adjacent to the lower end of the frame 19 and the endless flexible transmission means 20 has a loop 25 around this pulley. Thus, it should be apparent that movement of the float 19 on the surface of the liquid will cause the endless flexible transmission means 20 to move relative to the upper and lower pulleys 22 and 24. The movement of the upper pulley 22 is transmitted by means to be described to the indicator means 12 at the top of the drum head.

Figure 2:
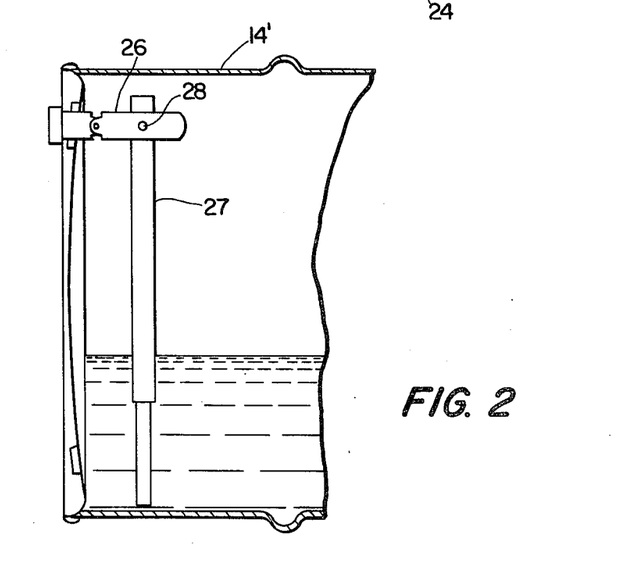
FIG. 2 is a view of one embodiment of the present invention as mounted for use in the end reading mode on a horizontally oriented liquid container.

As seen in FIG. 1, the elongated frame 18 has a first section 26 mounted beneath the indicator means 12 and second section 27 mounted below the first section 26 by means of a pivot pin 28. The function of the pivot pin connection 28 between the first and second frame sections of the device is generally illustrated in FIG. 2. In FIG. 2, we show a generalized view of the liquid level measuring device according to the present invention, as mounted on a standardized drum 14 in the end reading mode. In FIG. 2 the first frame section 26 adjacent to the end extends substantially at a right angle to the vertically oriented drum head. Extending at a right angle to the first frame section 26 is the second frame section 27 which extends downwardly to a position adjacent the lowermost portion of the interior of the drum. A comparison of FIGS. 1 and 2 shows that the device according to the present invention is constructed so that the elongated second frame section 27 can be moved on the pivot pin 28 from a position wherein the frame sections are coaxial (in FIG. 1) to a position wherein the frame sections are perpendicular to one another (FIG. 2). When the device is in the position shown in FIG. 2, we provide guide means to be described below, which guide means enable the endless flexible transmission means to be guided from its vertical orientation along the lower second frame section 27 to an orientation extending along the first frame section 26. The details of these guide means are discussed below.

A comparison with FIGS. 1 and 2 also indicates that the elongated frames extending to the lowermost portion of the containers have different lengths which conform to the dimensions of the drums. Thus, in FIG. 1, the elongated frame extends some 30" to the bottom of the drum while in FIG. 2, the elongated frame extends some 20" to the bottom of the drum. Thus, in addition to providing an angular adjustment capability to the present invention, we provide an additional dimension of adjustability to the elongated frame so that, when the frame sections are angularly adjusted, the proper vertical length can be obtained. The means for providing the length adjustment for the elongated frame according to one embodiment of the present invention are discussed in detail below. We also provide means to mount the device in an end reading mode without interfering with the desired vertical orientation of the second frame section. These details are also discussed below.

Thus, it should be apparent that according to the generalized description of the liquid level measuring device 11 of the present invention, we provide an adjustable frame device which is compact in design so that it can be inserted through a standard 2" opening found in standardized drums. Moreover, the ability for angular adjustment of the frame sections allows the device of the present invention to be used in a standard drum whether they are stored in a vertical or a horizontal mode. Furthermore, the construction of the device according to the present invention is such that the frame 18 along which the float 19 is translated is adjustable in length so that the device of the present invention is usable in various sizes of drums whether they are used in a vertical or horizontal orientation.

Figures 3, 3A:
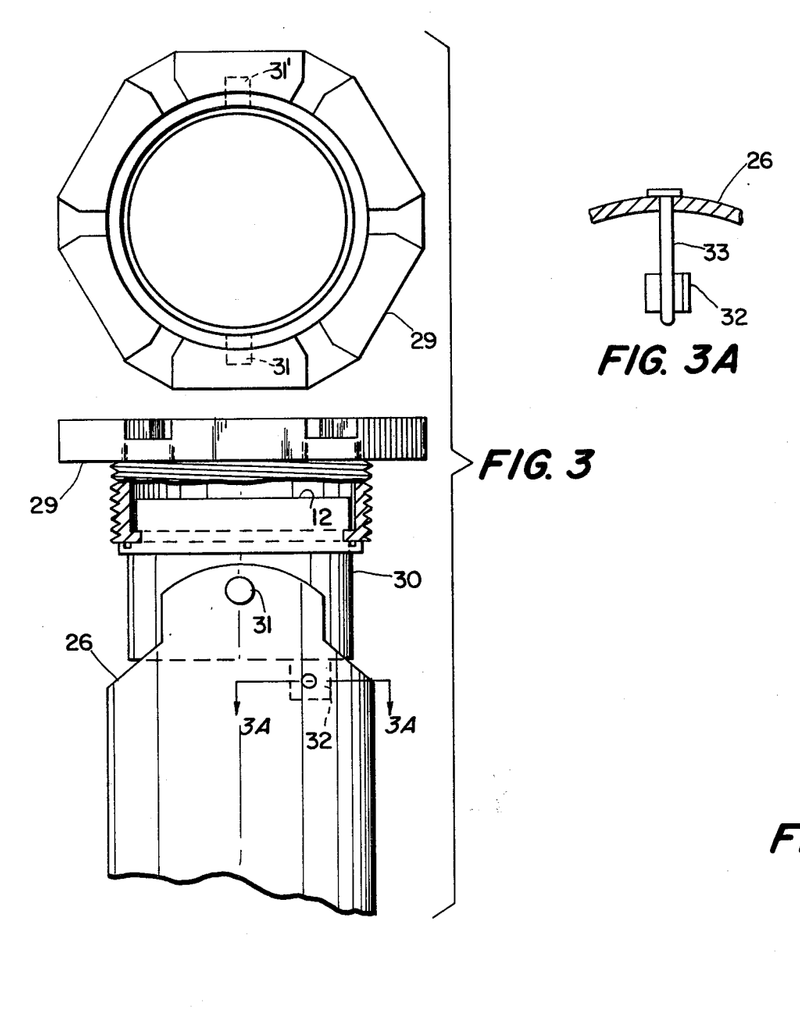
FIG. 3 is an exploded view of a portion of the liquid level measuring device according to one embodiment of the present invention.
FIG. 3A is a view taken along line 3A—3A in FIG. 3.

Referring now to FIG. 3, we show an exploded view of some of the features of the indicator means 12 and its connection to the first frame section 26 so that the device of the present invention is adaptable for use in measuring liquids in containers whether they are in a vertical or horizontal storage mode. Thus, in FIG. 3 we show a threaded flange member 29 which is adapted to be screwed into the threads contained in the 2" opening in a drum. Depending from the lower end of the flanged member 29 is a housing 30 which supports the elements of an indicator means 12 which typically includes a pointer and an associated scale which is adapted for visual reading by the user. Mounted on the exterior of the housing 30 for the indicator means 12 is a pivot pin 31 which extends outwardly from the cylindrical surface of the housing 30. Diametrically opposed pivot pins 31-31' are provided on the exterior of the housing. Pivotally connected to the pivot pins 31-31' is the upper end of the first frame section 26, a portion being shown in FIG. 3. When the liquid level measuring device of the invention is used in the top reading mode, the flanged member 29 is screwed into the 2" opening and the upper end of the first frame section 26 is freely mounted for pivoting about the pivot pins 31-31'. Of course, the force of gravity will cause the elongated frame 18 to seek out a vertical orientation which is perpendicular to the liquid surface. One purpose for having the pivot pin connection 31-31' between the frame section 26 and the housing 30 is that the standard drum head has an upward bulge (see FIG. 1) and the axis of generation for the threads in the 2" opening may be slightly skewed from the vertical for the drum. Thus, it is desirable to have the elongated frame 18 of the liquid level measuring device pivot by gravity to correct for any slight angle of deviation which would be caused if the housing 30 was rigidly connected to the elongated frame 18. Moreover, the pivot pins 31-31' enable the elongated frame 18 to seek a vertical orientation perpendicular with respect to the liquid level if, for some reason, the drum is not mounted in a true vertical position such as would occur if the drum is mounted on an uneven floor surface.

With further reference to FIG. 3, we provide an apertured ear 32 extending downwardly from the housing 30 as shown in dotted lines in FIG. 3. FIG. 3A shows that the apertured ear 32 is designed to cooperate with a locking pin 33 which is insertable through the wall of the first frame section 26 for purposes which are now described. When it is desired to use the device of the present invention in the end reading mode, the locking pin 33 is inserted through the wall of the first frame section 26 and through the aperture in the ear 32 attached to the housing 30. In this way, the housing 30 and the upper end of the first frame section 36 are rigidly connected. This rigid connection is necessary when the device is used in the end reading mode because the first frame section 26 is inserted into the drum in a horizontal position as seen in FIG. 2. If the first frame section 26 is free to pivot about the pivot pins 31-31' on the housing 30, then the first frame section 26 would pivot downwardly under gravity away from the horizontal position shown in FIG. 2. This could result in an inaccurate correlation between the position of the buoyant float 19 and the indicated liquid level in the drum in the end reading mode.

Figure 4:
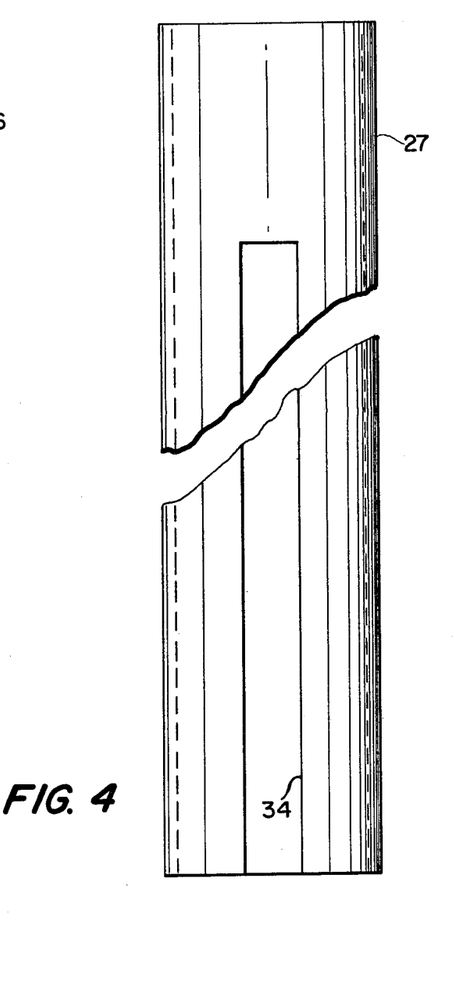
FIG. 4 is a view of a portion of the elongated frame for a liquid level measuring device embodying the present invention.

Referring to FIG. 4 of the drawing, we show a view of the form of the second section 27 of the elongated frame 18 according to one embodiment of the invention. The second frame section 27 is generally cylindrical in shape and has a length suitable for the desired range of adjustability required for the assembled device. In addition, the second frame section 27 has longitudinally extending slots 34-34' on opposite walls. The length of these slots 34-34' also is selected dependent upon the desired range of adjustability for the device. The second frame section 27 shown in FIG. 4 is adapted for pivotal mounting on the first frame section 26 as is best seen in FIG. 2 wherein the second section 27 is pivoted approximately at right angles to the first frame section.

Figure 5:
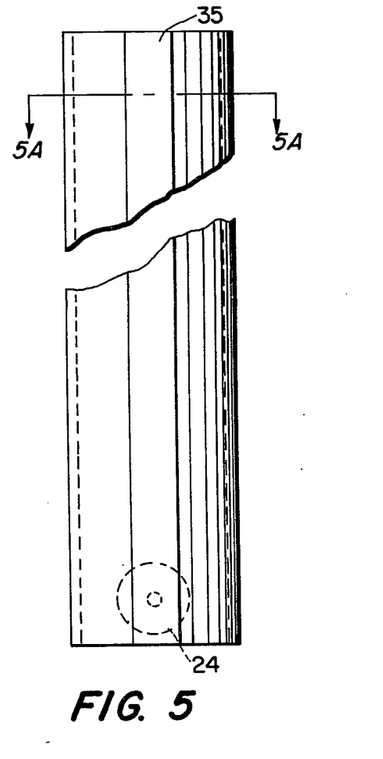
FIG. 5 is a view of a portion of the elongated frame for a device embodying the present invention.

Referring to FIG. 5, we show one embodiment of a means for mounting a portion of the flexible transmission means 20 on the lower end of the elongated frame 18.

Figure 5A:
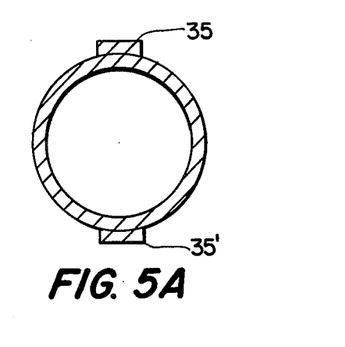
FIG. 5A is a view taken along line 5A—5A of FIG. 5.
Figure 6:
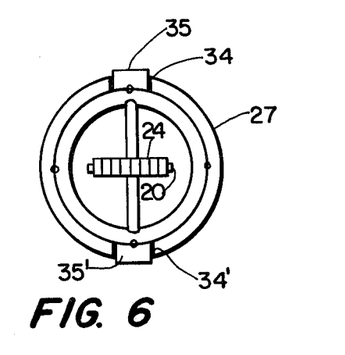
FIG. 6 is a partial view of the device embodying the present invention as shown in FIGS. 1 and 2 as would be seen looking upward from the bottom of the device.

As seen in FIGS. 5 and 5A, the exterior of the cylindrical mounting means is provided with longitudinally extending guide bars 35-35'. These guide bars 35-35' are configured to be slightly smaller in width than the width of the elongated slots 34-34' formed in the wall of the cylindrical second frame section 27 shown in FIG. 4. In assembly, the mounting means shown in FIG. 5 is inserted telescopically inside of the cylindrical second frame member 27 as shown in FIG. 4. The arrangement of the mounting means and second frame section 27 is illustrated in FIG. 6, which is a view looking upwardly from the bottom of the engaged members. Mounted adjacent the bottom of the inner cylindrical member is a rotatably mounted pulley 24 which serves as a means to mount the lower end loop 25 of the flexible transmission means 20. In operation, the cylindrical mounting means is sufficiently weighted so that the force of gravity will cause it to seek out the lowermost position with respect to the second frame member 27. The weight of the mounting means will provide a gravity-biased force on the pulley 24 which tensions the lower loop portion 25 of the endless flexible transmission means 20. Thus, when the liquid level measuring device is in a top reading mode, the weighted lower mounting means will insure that the endless transmission means 20 is fully extended and under tension. When the liquid level measuring device is in the end reading mode, the second frame section 27 has been pivoted to be perpendicular to the first frame section and the mounting means will also provide a sufficient gravity-biasing force to maintain tension on the endless transmission means 20.

It should be understood that the cylindrical mounting means shown in FIGS. 5 and 5A can be of any desired length to insure that the lower end of the mounting means will approach the lowermost portion of the liquid container when the device is being used in either of the two modes of operation. Furthermore, according to one aspect of the present invention, we provide at least two alternate mounting means having different preselected lengths. One mounting means is sized in its length so that the measuring device will substantially extend from the top to the bottom of one size of a uniform container such as a 30-gal. drum. An alternate length mounting means may be provided for use in larger drums where the degree of adjustability is not provided by the slots 34–34' and guide bars 35–35'. In order to provide alternate length mounting means for the lower portion of our liquid level measuring device, the user merely needs to detach the lower loop 25 of the flexible transmission means 20 from the pulley 24 and, thereafter, remove the mounting means from the remainder of the device by sliding it telescopically therefrom. Then the user would insert the alternate length cylindrical mounting means into the guide slots 34–34', and reassemble the lower loop 25 of the flexible transmission means 20 around the pulley 24. Thus, it should be apparent that the length of the device, according to the present invention, can be modified by the use of alternate length mounting means for the flexible transmission means 20. The other parts of the device frame do not require alteration in order to make such an alternative length device.

Figures 7, 8, 9:
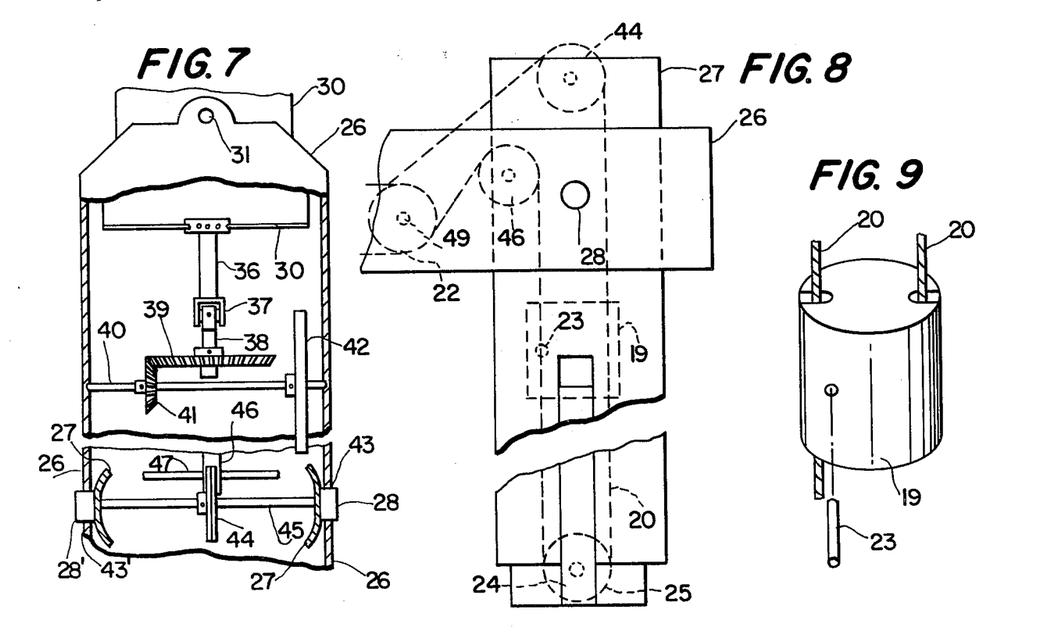
FIG. 7 is an enlarged view, with portions broken away, of the device according to one embodiment of the present invention.
FIG. 8 is a partial schematic view of a device according to the present invention wherein sections of the elongated frame are angularly displaced by 90 degrees.
FIG. 9 is a view illustrating a buoyant float according to one embodiment of the present invention.

Referring to FIG. 7, we show an enlarged view, with portions broken away, of one embodiment of the present invention. FIG. 7 shows the arrangement of elements adjacent to the indicator means 12. Housing 30 is connected by pivot pin 31 to one end of the first frame section 26. According to one embodiment of the present invention, the first section 26 is cylindrical in cross section and defines a hollow interior. Various forms of indicator means can be mounted for reading through the opening in the face of the indicator means. Extending downwardly from the housing 30 is a rotatable shaft 36 which is connected by means of a universal joint 37 to a stub shaft 38 bearing a bevel gear 39. Mounted diametrically across the interior of the first frame section 26 is a shaft 40 rotatably journaled at each end in a bearing portion formed in the wall of the first frame section 26. Fixedly attached to the rotatable shaft 40 is a bevel gear 41 engaging the bevel gear 38 on the vertical stub shaft 38 extending from the indicator means. Also fixedly attached to the shaft 40 is drive pulley 42 which is driven by means to be discussed below.

In the lower portion of FIG. 7 we have shown a portion of our liquid level measuring device broken away from the rest of the device. The lower portion of FIG. 7 is a partial view which would be seen looking downwardly from the top of the second frame section 27 as seen in FIG. 2. Thus, we illustrate a portion of the hollow cylindrical second frame section 27 which is extending at right angles to the axis of the first frame section 26 shown in FIG. 7. As seen in the lower portion of FIG. 7, the second frame section 27 is provided with external pivot pins 26–28' which extend outwardly through openings 43–43' diametrically disposed on the first frame section 26. These pivot pins and openings cooperate to form a pivotal connection between the first and second frame sections so that the frame sections can be pivoted from a position wherein their longitudinal axes are coincident to a position wherein the longitudinal axes are coplaner and perpendicular. As seen in FIGS. 7 and 8, the upper end of the second frame section 27 is provided with a pulley 44. The pulley 44 is mounted on a rotatable shaft 45 journaled in the walls of the second frame section 27 as best seen in the lower portion of FIG. 7. As seen looking downward from the top of the second frame section 27 in the lower portion of FIG. 7, we also provide a guide pulley 46 rotatably journaled on a shaft 47 extending across the interior of the hollow second frame section 27. It should be understood that the guide pulley 46 is mounted on the second frame section 27 below the upper pulley 44 and is oriented along a cord of the second frame section 27. The purpose and function of the guide pulley 46 will be described below.

Referring to FIG. 8, we schematically illustrate the arrangement of the flexible transmission means 20 with respect to the frame sections when our device is in the end reading mode. Thus, the first frame section 26 has been pivoted about its pivot with the second frame section 27 and the lower end of the second frame section extends downwardly toward the bottom of the liquid container. Slidably mounted within the bottom of the second frame section 27 is the cylindrical means for mounting the lower loop 25 of the flexible transmission means. According to our preferred embodiment, we use a chain (see FIG. 9) formed of interconnected links as our flexible transmission means. However, it should be understood that other flexible transmission means such as cables, tapes or similar endless transmission means may be utilized according to the present invention. Referring to FIG. 8, the chain extends downwardly and loops around the pulley 24 provided at the lower end of the mounting means which is slidably engaged with the second frame section 27. One upward portion of the chain extends to the top of the second frame section and loops over the pulley 44 which is rotatably mounted at that point. The chain then goes to a rotatably mounted idler pulley 22 which is rotatably mounted on a shaft 49 journaled across the first frame section 26. The chain loops around the idler pulley 22 and extends back toward the upper end of the second frame section 27, where it loops over a guide pulley 46 rotatably mounted on the second frame section 27. Thereafter, the chain extends downwardly toward the pulley 24 at the lower end of the device. The idler pulley 22 rotatably mounted on the first frame section is connected by suitable means to the drive pulley 42 mounted on the shaft 40 which is used to drive the bevel gear 41 for transmitting motion to the indicator means 12 as best seen in FIG. 7. Different sized alternative drive pulleys 42 may be used to aid in the adjustability of the measuring device of our invention. The sizes can be determined by the physical parameters of the device needed for a particular drum size.

As shown schematically in FIGS. 8 and 9, a float 19 is fixed at one portion 23 of the chain and the other portion of the chain extends past the float without connection. Thus, when the device of FIG. 8 is positioned in a liquind-containing drum, the buoyant forces of the liquid on the buoyant float 19 move it with respect to the second frame section 27 in a vertical direction. Since one portion of the chain is rigidly connected to the buoyant float 19, the movement of the float will be transmitted through the chain to move the chain around the various pulleys which mount it on the first and second frame sections. It should be apparent that the means for mounting the lower end of the chain will facilitate the tensioning of the chain so that movement of the float attached thereto will be accurately translated into rotatable motion of the drive pulley 42 on the first frame section, as seen in FIG. 7.

Figures 10, 11:
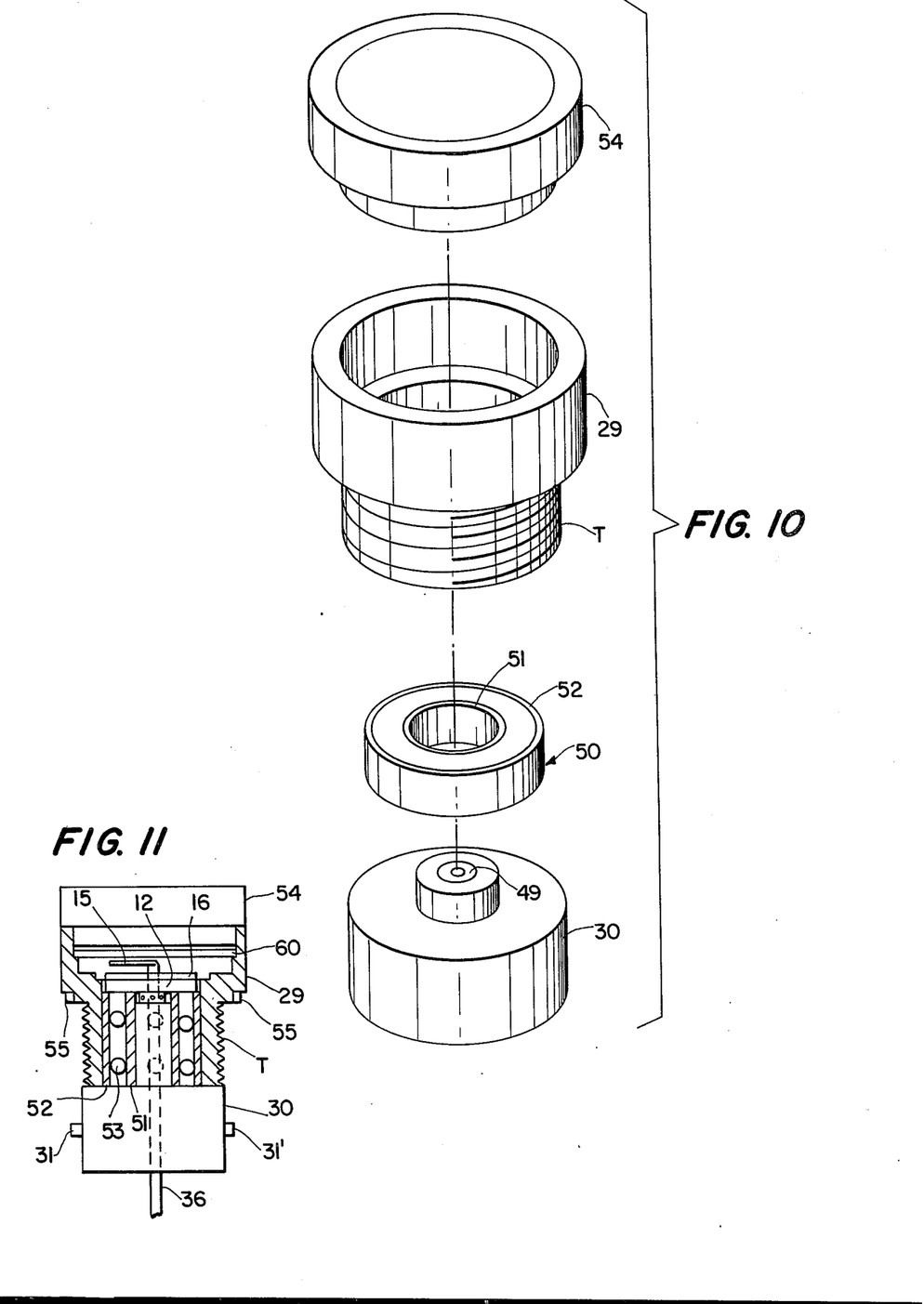
FIG. 10 is an exploded view of the indicator means of one embodiment of the present invention.
FIG. 11 is a cross-sectional view of the indicator means of the embodiment of the present invention.

The use of a chain and the associated pulleys as seen in FIG. 8 facilitates the conversion of the device from operation in the end reading mode to operation in the top reading mode. Thus, to convert from the end reading mode to the top reading mode, the first frame section is pivoted in a counter-clockwise direction so as to bring the first and second frame sections into coaxial alingment. During this pivoting the pulleys mounted on the upper end of the second frame section will be moved out of a position where they deflect the chain and the chain will be left engaged between the idler pulley 22 in the first frame section 26 and the pulley 24 mounted on the mounting means which is slidably mounted at the lower end of the device. Of course, if the device is converted from the top reading mode back to the end reading mode, the pulleys adjacent the top of the second section will engage the chain and come into operation once again. Referring now to FIGS. 10 and 11 we show an improved means for mounting the indicator means and elongated frame to the opening in a liquid container so that, when the measuring device is secured in the opening for an end reading position, the attachment of the flanged member 29 to the opening will not interfere with the desired orientation of the indicator means and the first and second frame sections.

In FIGS. 10 and 11 we show the lower housing 30 having pivot pins 31-31' extending therefrom as described above. The upper end of the housing 30 has a reduced diameter portion. A central opening is provided through the housing 30 for receiving shaft 36 and for mounting a sealing bearing 49 on the upper portion of the housing 30. Engaged downward over the reduced portion on the upper part of the housing 30 is a sealed bearing unit 50 having an inner cylindrical member 51 and an outer cylindrical member 52 with ball bearings 53 disposed therebetween. The internal diameter of the inner cylindrical member 51 fits with an interference fit down over the upwardly extending reduced portion of the housing 30. Extending downwardly around the exterior of the outer cylindrical member 52 of the bearing is the threaded flanged member 29 having threads T for engagement with the threads in the opening of a drum head and having an upper hollow interior portion. As seen in FIG. 11, the shaft 36 extends through the housing 30 and sealing bearing 49, and is connected to a pointer 15 for the indicator means. Mounted on the inner cylindrical member 51 and beneath the pointer is a dial face which has suitably calibrated scale 16 indicia thereon. Mounted on an internal shouldered portion of the flanged member 29 is a glass disc 60 which protects the pointer and dial face. The glass disc is held in place by an engagable cap 54 which is inserted down into the upper portion of the flanged member 29. As seen in FIG. 11, we may also provide a circular seal element 55 adjacent the flange of the flanged member 39 so that the entire unit can be sealingly engaged into the opening in a drum head. The use of the bearing unit 50 to connect the housing 30 and the threaded flanged member 29 for engaging the drum head enables the indicator means 12 and housing 30 to be rotatable through 360 degrees since the housing 30 is connected to the inner cylindrical bearing member 51 and it is free for rotation with respect to the outer cylindrical member 52 of the bearing which is rigidly connected to the thread flanged member 29.

The purpose of providing the 360 degree rotatability for the indicator means arises from the fact that the threads provided in drum heads can vary from drum to drum. Thus, the threaded flange member 24 will not always stop at the same position. Thus, when the device is used in the end reading mode, the dial faces will present differing angular orientations to the reader absent the present invention. However, the sealed bearing unit 50 allows the indicator means 12, housing 30, and its related pivot pins 31-31' to rotate independent of where the threaded flanged member 29 is fixed in the threaded opening of the drum head. As discussed above in connection with FIGS. 3 and 3A, when our device is in the end reading mode, the first frame section 26 is rigidly secured to the housing 30. Thus, if the housing 30 is in other than a preferred alignment upon being secured to the drum head opening, the pivot pins 28 provided between the first and second frame sections will not be in the desired orientation, e.g., horizontal orientation with respect to the bottom of the liquid container. By providing bearing unit 50, the first frame section 26 is free to rotate and to seek out a position which presents pivot pins 28 in a horizontal position.

The invention has been described in detail with particular reference to the preferred embodiments thereof, but it should be understood that variations and modifications can be effected within the spirit and scope of our invention as described herein and defined in the appended claims.

We claim:

1. In a liquid level measuring device for measuring the level of a liquid in a container, said device comprising indicator means adapted for mounting on a container for providing a visual reading related to the level of the liquid in a container; a frame connected to said indicator means and being adapted for mounting in a container; a buoyant float adapted for floating on the surface of the liquid; an endless flexible transmission means having a first portion adjacent said indicator means and another portion connected to said float; and means for movably mounting said endless flexible transmission means on said frame so that movement of said float moves said first portion of said transmission means relative to said indicator means, the improvement comprising:

said frame has first and second elongated frame sections, said first frame section being adapted for mounting within the interior of said container on the wall thereof; said second frame section being adapted to extend to a position adjacent to the lowest point of the interior of said container;

connector means for connecting said second frame section with said first frame section for angular displacement relative to the first frame section within the interior of the container;

said means for mounting said transmission means includes means mounting said first portion on said first elongated section of said frame, means for mounting another portion of said transmission means on said second elongated section of said frame, and guide means adjacent to said connector means for guiding said transmission means when said second section is in an angularly displaced position relative to the first section.

2. The invention of claim 1, wherein said connector means pivotally connects said first and second frame sections.

3. The invention of claim 1, wherein said first and second frame sections define a housing with a hollow interior and said buoyant float is disposed for movement within said interior.

4. The invention of claim 2, wherein said connector is disposed adjacent one end of said first frame section and intermediate the ends of said second frame section, and said guide means is mounted on said second frame section between said connector and the upper end of said second frame section whereby, when said sections are angularly disposed, said float can move to a position adjacent said guide means, whereby said flexible transmission means is moved over said guide means.

5. The invention of claim 1, wherein said means for mounting said transmission means on said second frame section includes an extension means movably mounted on the lower end of said second frame section to provide an extension thereof, pulley means rotatably mounted on said extension means, and said endless flexible transmission means has a loop portion engaging said pulley means so that said pulley means rotates when said transmission means is moved.

6. The invention of claim 5, wherein said guide means includes a first pulley means rotatably mounted adjacent the upper end of said second frame section, and said endless flexible transmission means has a loop portion engaging said pulley means so that said pulley means rotates when said transmission means is moved when said second section is in an angularly displaced position relative to said first section.

7. The invention of claim 6, wherein said guide means further includes a second pulley means rotatably mounted adjacent the upper end of said second frame section, said second rotatable pulley means being adapted to be engaged by a loop portion of said endless flexible transmission means when said first and second frame sections are angularly displaced in the end reading mode of use of said measuring device.

8. The invention of claim 1, wherein said indicator means comprises a scale means and a pointer fixed to a rotatable shaft rotatably connected to the first portion of said transmission means, whereby movement of said transmission means moves said pointer in relation to said scale means.

9. The invention of claim 1, wherein said first frame section and said indicator means are pivotally connected by pivot means therebetween, locking means adapted for rigidly connecting said first frame section and said indicator means, said first frame section and said indicator means being adapted for relative pivotal movement on said pivot means in the top reading mode of use of said measuring device and being rigidly connected by said locking means in the end reading mode of use of said measuring device.

10. The invention of claim 9, further comprising mounting means adapted to rotatably mount said indicator means and said first elongated frame section on said container, said mounting means having securing means for engagement with securing means on said container and being constructed and arranged so that said indicator means and said first elongated frame section are adapted to rotate about the longitudinal axis of said first elongated frame section in the end reading mode of use of said measuring device.

* * * * *